United States Patent [19]

Nakamura

[11] 4,091,373

[45] May 23, 1978

[54] SELECTIVE CALLING RECEIVER

[75] Inventor: Junpei Nakamura, Tokyo, Japan

[73] Assignee: Kabushiki Kaisha Daini Seikosha, Japan

[21] Appl. No.: 721,782

[22] Filed: Sep. 9, 1976

[30] Foreign Application Priority Data

Sep. 10, 1975 Japan .......................... 50-124662[U]

[51] Int. Cl.[2] ........................................... H04M 11/02

[52] U.S. Cl. ...................................... 340/311; 325/55

[58] Field of Search .......................... 340/311; 325/55

[56] References Cited

U.S. PATENT DOCUMENTS

| | | | |
|---|---|---|---|
| 3,846,783 | 11/1974 | Apsell | 325/55 |
| 3,937,004 | 2/1976 | Natori | 325/55 |
| 3,984,775 | 10/1976 | Cariel | 340/311 |

*Primary Examiner*—Thomas B. Habecker

*Attorney, Agent, or Firm*—Robert E. Burns; Emmanuel J. Lobato; Bruce L. Adams

[57] ABSTRACT

A selective calling receiver comprises a resettable sound circuit for generating an audible calling sound in response to a calling message, a display circuit for visually displaying a message and a control circuit which is manually operable to reset the sound circuit and simultaneously activate the visual display circuit so that the message can be read.

6 Claims, 2 Drawing Figures

SELECTIVE CALLING RECEIVER

FIELD OF INVENTION

The present invention relates to a selective calling receiver and more particularly to a receiver having a sound circuit which generates an audible calling sound in response to a calling message and a display circuit for visually displaying the message received.

BACKGROUND OF INVENTION

Conventionally, selective calling receivers have used an analogue signal as the selective signal. However, the use of digital signals as the selective signal has many functional advantages. In this case, the selective calling receiver includes a sound circuit which generates an audible sound as a calling signal and a visual display circuit which displays the message visually.

Liquid crystals, light emitting diodes (LED) etc., may be used as the display element of the visual display circuit. Liquid crystals have the disadvantage that their useful life is only about a year whereupon they must be replaced. Hence, light emitting diodes are frequently used. However, when using light emitting diodes, it is necessary to provide a control circuit for energizing the diodes only when the message is to be read in order to avoid power dissipation and short battery life. This control circuit is different from the control circuit which resets the sound circuit so as to stop the calling sound. Accordingly, it is a defect of selective calling receivers that use an LED display that they have many operating sections and that the operation of the LED display is difficult.

The method of resetting the sound circuit with a timer in order to simplify the operation has the disadvantage that the calling sound continues to be generated after it has attracted the attention of the recipient. This is particularly objectionable if the person receiving the call is in a meeting.

Selective calling receivers have accordingly heretofore had functional disadvantages as well as manufacturing disadvantages by reason of the number of parts required for the receiver and the labor involved in assemblying the parts.

SUMMARY OF INVENTION

It is accordingly a primary object of the present invention to provide a low cost selective calling receiver requiring a relatively small number of parts and yet providing excellent operating characteristics. In accordance with the invention, the selective calling receiver comprises a resettable sound circuit for generating an audible calling sound in response to a calling message, a display circuit for visually displaying a message and a control circuit for resetting the sound circuit so as to discontinue the calling sound and for simultaneously activating the display circuit so as to display the message.

BRIEF DESCRIPTION OF DRAWINGS

The nature, objects and advantages of the invention will be more fully understood from the following description in conjunction with the accompanying drawings, in which.

DESCRIPTION OF PREFERRED EMBODIMENT

Figure 1:
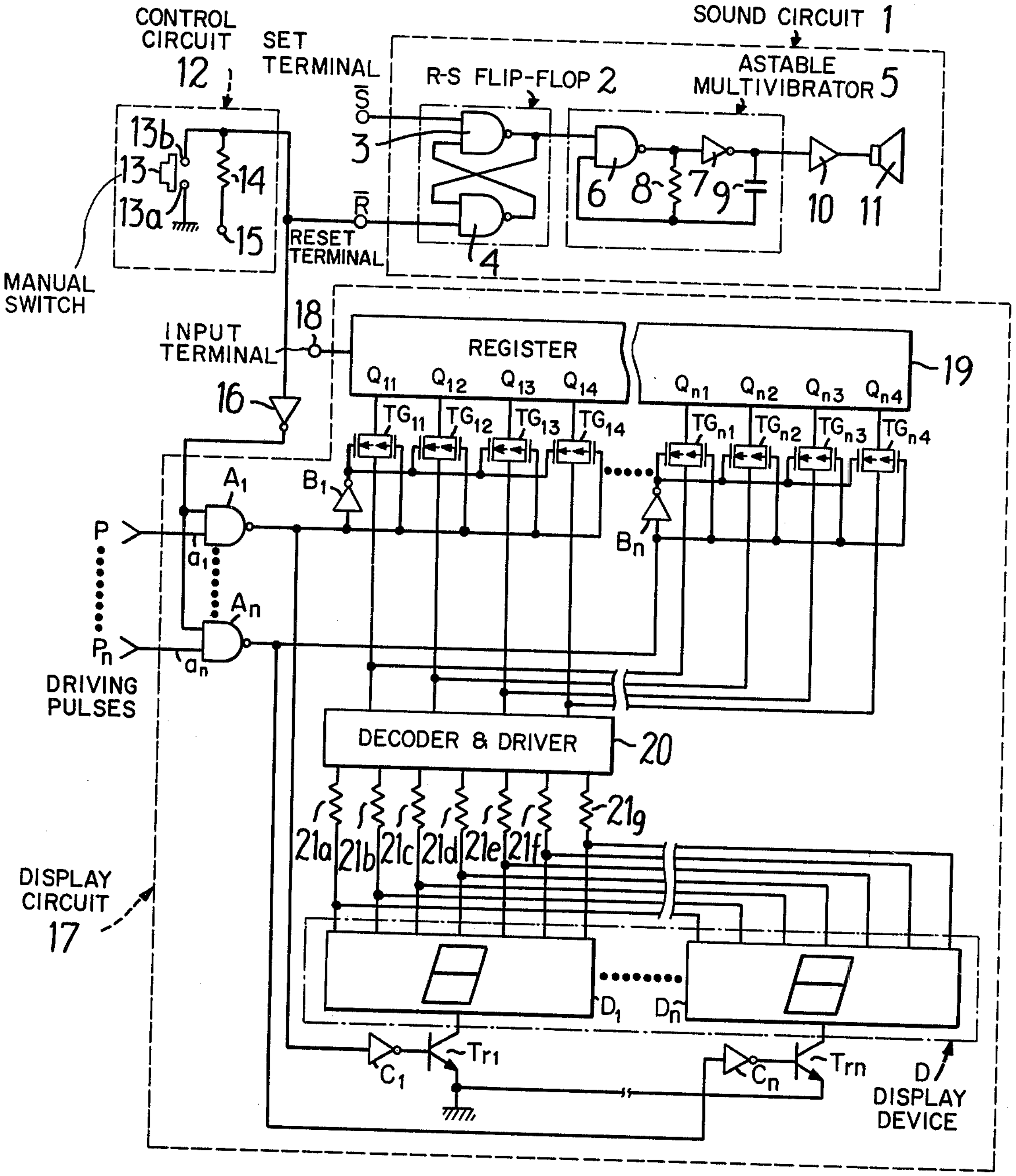
FIG. 1 is a circuit diagram of a preferred embodiment of the selective calling receiver in accordance with the present invention.

The embodiment of the invention illustrated in FIG. 1 comprises a sound circuit 1, a visual display circuit 17 and a control circuit 12.

The sound circuit 1 comprises an R-S flip-flop 2 composed of two NAND circuits 3 and 4, a known astable multi-vibrator 5 composed of a NAND circuit 6, inverter 7, resistor 8 and capacitor 9, a buffer amplifier 10 and a speaker 11. One input terminal of the NAND circuit 3 is the set terminal $\overline{S}$ of the R-S flip-flop 2 and receiver the calling signal having a negative logic and derived from the receiving section which is not shown in the drawings. One input terminal of the other NAND circuit 4 is the reset terminal $\overline{R}$ of the R-S flip-flop 2 and receives a control signal of negative logic level derived from the control circuit 12. The other input of the NAND circuit 3 is connected to the output of NAND circuit 4 and the other input of NAND circuit 4 is connected to the output of NAND circuit 3. The output of NAND circuit 3 is the output of the R-S flip-flop 2 and is connected to one input of the NAND circuit 6 of the astable multivibrator 5. The output of the NAND circuit 6 is connected through the inverter 7 to the buffer amplifier 10 of the speaker 11. The other input of the NAND circuit 6 is connected through the resistor 8 to the output of the NAND circuit 6 and is connected through capacitor 9 to the output side of the inverter 7.

The control circuit 12 comprises a manual switch 13, one terminal 13a of which is connected to ground corresponding to the logic level "0" while the other terminal 13b is connected to the reset terminal $\overline{R}$ of the R-S flip-flop 2 and through a resistor 14 to a terminal 15 corresponding to the logic level "1". Thus, the control circuit 12 produces a control signal of logic level "1" when the manual switch 13 is open and a control signal of logic level "0" when the switch 13 is manually closed.

The control signal provided by the control circuit 12 is thus fed to the reset terminal $\overline{R}$ of the R-S flip-flop 2 and is also fed through an inverter 16 to one input terminal of each of the NAND circuits $A_1$–$A_n$ which drive the display elements $D_1$–$D_n$ of the display circuit 17.

The display circuit 17 comprises a register 19 which stores the message fed to input terminal 18. The message is the coded calling content transmitted from the transmitter which is not shown in the drawing. The register 19 has output terminals $Q_{11}$–$Q_{14}$ . . . $Q_{n1}$–$Q_{n4}$ which provides BCD coded signals to the input terminals of corresponding transmission gates $TG_{11}$–$TG_{14}$ . . . $TG_{n1}$–$TG_{n4}$.

The output terminals of transmission gates $TG_{11}$ . . . $TG_{n1}$ are connected in common, the output terminals of $TG_{12}$ . . . $TG_{n2}$ are connected in common, the output terminals of $TG_{13}$ . . . $TG_{n3}$ are connected in common, etc., and these common output terminals are respectively connected to input terminals of a decoder and driver 20.

The seven segment signal outputs of the decoder and driver 20 are connected through resistors $21_a$–$21_g$ respectively to the anodes of the LED display elements of each of the display units $D_1$–$D_n$ composing the digital display device D. The cathodes of the LED display elements of the display unit $D_1$ are connected in common to the collector of a driving transistor $Tr_1$. In like manner, the cathodes of the LED display elements comprising the display element $D_n$ are connected in common to the collector of a driving transistor $Tr_n$. The emitters of transistors $Tr_1$ and $Tr_n$ are connected to ground.

The output signal of the NAND circuit $A_1$ is fed to one of the control terminals of each of the transmission gates $TG_{11}$–$TG_{14}$ and is also fed through an inverter $B_1$ to the other control terminals of transmission gates $TG_{11}$–$TG_{14}$. The output signal of the NAND circuit $A_n$ is fed to one of the control terminals of each of the transmission gates $TG_{n1}$–$TG_{n4}$ and is fed through an inverter $B_n$ to the other control terminals of transmission gates $TG_{n1}$–$TG_{n4}$.

The output signal of the NAND circuit $A_1$ is fed to the base terminal of the driving transistor $Tr_1$ through an inverter $C_1$ and the output signal of the NAND circuit $A_n$ is fed to the base terminal of the driving transistor $Tr_n$ through the inverter $C_n$.

Driving pulses $P_1$–$P_n$ which differ from one another in phase and which are produced by a driving pulse generator not shown in the drawing are applied to input terminals $a_1$–$a_n$ of the NAND circuits $A_1$–$A_n$ periodically.

Figure 2:
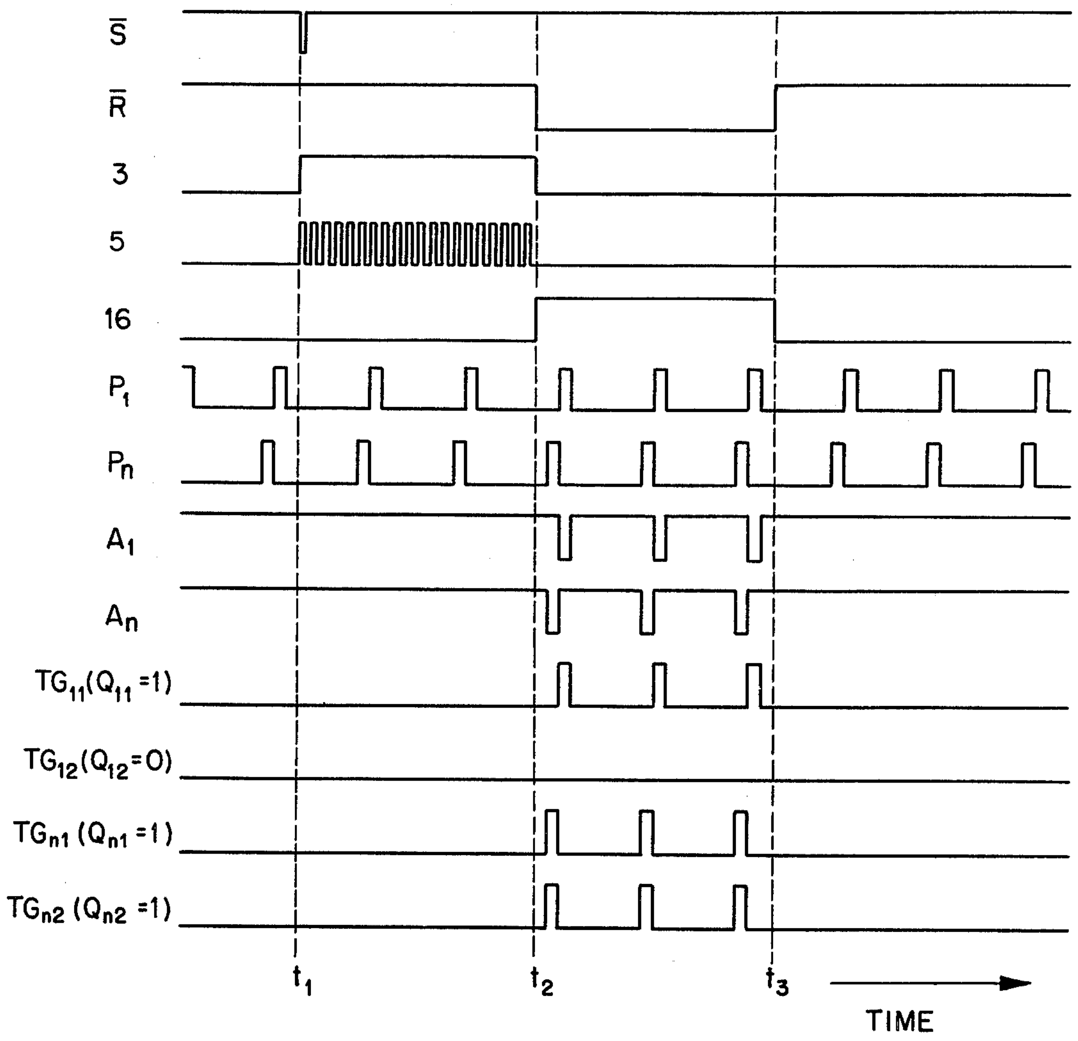
FIG. 2 is a time chart explaining the action of the selective calling receiver of FIG. 1.

The action of the selective calling receiver in accordance with the invention will now be described with reference to the time chart shown in FIG. 2. FIG. 2 shows the wave shapes of input signals and output signals of respective circuit components which are designated by the same reference numerals as in FIG. 1.

In the normal state in which the switch 13 of the control circuit 12 is open and the selective calling receiver is not called by the selective calling transmitter, the set terminal $\bar{S}$ and the reset terminal $\bar{R}$ of the R-S flip-flop 2 are at the logic level "1". As this time, the output signal of the NAND circuit 3 is in the state of logic level "0". The astable multivibrator 5 is maintained in a nonactive state since the NAND circuit 6 of the multivibrator receives the logic "0" output signal of the NAND circuit 3.

The output signals of the NAND circuits $A_1$–$A_n$ of which the input terminals receive the output signal of the control circuit 12 through the inverter 16 are maintained at the logic level "1" since the output signal of the control circuit 12 is in the state of logic level "1" as the switch 13 is open.

The transmission gates $TG_{11}$–$TG_{14}$ and $TG_{n1}$–$TG_{n4}$ are in the off state because of the output signals of the NAND circuits $A_1$–$A_n$. The driving transistors $Tr_1$–$Tr_n$ of the display device D are in the off state since the base terminals of the transistors are at a low electric potential by reason of the output signals of NAND circuits $A_1$–$A_n$ transmitted through the inverters $C_1$–$C_n$. Accordingly, the display apparatus D of the display circuit 17 is maintained in a nonactive state.

When the selective calling receiver receives a message and selective calling signal from the transmitter (not shown) at the time $t_1$ in FIG. 2, the message is stored in the register 19 and at the same time, the set terminal $\bar{S}$ of the flip-flop 2 receives a signal of the logic level "0". In response to this signal of the logic level "0", the output signal of the NAND circuit 3 in the R-S flip-flop 2 is inverted from the logic level "0" to the logic level "1". The astable multivibrator 5 is thereby activated and oscillates at a period corresponding to the time constant determined by the resistance of the resistor 8 and the capacitance of the capacitor 9 whereby the multivibrator 5 produces an oscillating signal as shown in FIG. 2. The buffer 10 amplifier this oscillating signal in current whereby the speaker 11 is driven to produce an audible signal. Thus, the second circuit 1 is actuated by the selective calling signal.

When the operator who has heard the audible signal produced by the sound circuit 1 actuates the manual switch 13 of the control circuit 12 at the time $t_2$, the reset terminal $\bar{R}$ of the flip-flop 2 receives the control signal of the logic level "0" so that the output signal of the R-S flip-flop 2 is inverted. Therefore, the output signal of the NAND circuit 3 becomes logic level "0" whereby actuation of the astable multivibrator 5 is stopped.

On the other hand, since the switch 13 is now in ON position, the output signal of the control circuit 12 becomes logic level "0" and accordingly the output signal of the inverter 16 becomes logic level "1". The NAND circuits $A_1$–$A_n$ are thereby activated so as to produce driving pulses $P_1$–$P_n$ as the output signals thereof respectively. Accordingly, transmission gates $TG_{11}$–$TG_{14}$ are periodically switched ON and OFF in synchronization with the period of the driving pulse $P_1$. The transmission gates $TG_{n1}$–$TG_{n4}$ are similarly switched ON and OFF in synchronization with the period of the driving pulse $P_n$. The driving pulses $P_1$–$P_n$ are respectively different in phase so that transmission gates $TG_{n1}$–$TG_{n4}$ are in the OFF state when transmission gates $TG_{11}$–$TG_{14}$ are in the ON state.

The output signals of the register 19 are fed to the decoder and driver 20 in a time sharing manner by reason of operation of the transmission gates $TG_{11}$–$TG_{14}$ . . . $TG_{n1}$–$TG_{n4}$ as described. FIG. 2 shows the wave shape of the output signals of $TG_n$, $TG_{12}$, $TG_{n1}$ and $TG_{n2}$ in the state in which the output signals of the terminals $Q_{11}$, $Q_{n1}$ and $Q_{n2}$ of the register 19 are in the state of logic level "1" and the output signal of the terminal $Q_{12}$ is in the state of logic level "0".

The driving transistors $Tr_1$–$Tr_n$ are switched ON and OFF periodically in response to the output signals synchronized with the driving pulses $P_1$–$P_n$ derived from the output terminals of the NAND circuits $A_1$–$A_n$. Accordingly, the display device D is driven in a dynamic state in the period of the driving pulses $P_1$–$P_n$ and visually displays the stored contents of the register 19.

At the time $t_3$, when the switch 13 is switched to the OFF state, the output signal of the control circuit 12 changes from logic level "0" to logic level "1". At this time the display circuit 17 ceases to operate since the NAND circuits $A_1$–$A_n$ inhibit passage of the driving pulses $P_1$–$P_n$.

Also, the input of the resetting terminal $\bar{R}$ changes from the logic level "0" to the logic level "1". In this case, the output state of the R-S flip-flop 2 does not change and hence the sound circuit 1 is maintained in an nonactive condition. As mentioned above, the sound circuit 1 is reset and at the same time the display circuit 17 is set by the operation of the switch 13. Accordingly, the selective calling receiver in accordance with this invention eliminates the complicated operation required by the multifunction of the selective calling receiver. Also, the selective calling receiver in accordance with the invention can be manufactured at low cast because of the small number of components.

It will be obvious to those skilled in the art that many modifications and variations of the circuitry described above may be made. Hence, the invention is in no way limited to the preferred embodiment illustrated in the drawings and herein particularly described.

As mentioned above, the selective calling receiver in accordance with the invention has such circuit structure that the sound circuit is reset and at the same time the display circuit is set by the operation of a single switch. Thus, the switch performs both the operation of displaying the received message and of stopping the audible calling signal so that operation of the receiver is easy.

What I claim is:

1. A selective calling receiver comprising sound circuit means for generating an audible sound in response to a calling message received from a remote transmitter, a register for receiving and storing a coded message from said transmitter, electronic display means for visually displaying said coded message received from said register, gating means for controlling the transmission of said coded message from said register to said display means and a control circuit including a manual switch and means for terminating said audible sound and resetting said sound circuit and for activating said gating means for transmission of said coded message from said register to said display means upon operation of said manual switch.

2. A selective calling receiver according to claim 1, in which said sound circuit means is normally continually responsive to said calling message.

3. A selective calling receiver according to claim 1, in which said sound circuit means comprises an R-S flip-flop, an astable multivibrator connected to the output of said flip-flop and a buffer amplifier and speaker connected to the output of said multivibrator.

4. A selective calling receiver according to claim 3, in which said R-S flip-flop comprises two cross-connected NAND circuits, one of said NAND circuits having an input connected with said control circuit.

5. A selective calling receiver according to claim 1, in which said gating means comprises a plurality of transmission gates for connecting said register with said display means, means for receiving a driving pulse from a pulse source, and means for periodically switching said transmission gates on and off in synchronism with said driving pulse.

6. A selective calling receiver according to claim 5, in which said gating means further comprises a plurality of NAND circuits having outputs connected with control terminals of said transmission gates and with said display circuit means, each of said NAND circuits having an input connected with said control circuit and an input connected with said pulse receiving means.

* * * * *